(12) United States Patent
Epars et al.

(10) Patent No.: US 8,869,678 B2
(45) Date of Patent: Oct. 28, 2014

(54) EXCHANGEABLE FILTER FOR BEVERAGE PRODUCTION DEVICE AND BEVERAGE PRODUCTION DEVICE COMPRISING SUCH FILTER

(75) Inventors: Yann Epars, Penthalaz (CH); Ulrich Achtnich, Dietikon (CH)

(73) Assignee: Nestec S.A., Vevey (CH)

( * ) Notice: Subject to any disclaimer, the term of this patent is extended or adjusted under 35 U.S.C. 154(b) by 523 days.

(21) Appl. No.: 12/864,441

(22) PCT Filed: Jan. 23, 2009

(86) PCT No.: PCT/EP2009/050739
§ 371 (c)(1),
(2), (4) Date: Sep. 28, 2010

(87) PCT Pub. No.: WO2009/092774
PCT Pub. Date: Jul. 30, 2009

(65) Prior Publication Data
US 2011/0041700 A1 Feb. 24, 2011

(30) Foreign Application Priority Data

Jan. 24, 2008 (EP) .................................. 08100897

(51) Int. Cl.
| A47J 31/06 | (2006.01) |
| B01D 35/00 | (2006.01) |
| B01D 24/00 | (2006.01) |
| B01D 29/00 | (2006.01) |
| A47J 31/60 | (2006.01) |
| A47J 31/40 | (2006.01) |

(52) U.S. Cl.
CPC ............... *A47J 31/605* (2013.01); *A47J 31/06* (2013.01); *A47J 31/407* (2013.01)
USPC .............................. 99/295; 210/471; 210/473

(58) Field of Classification Search
USPC ............... 99/280, 282, 283, 295, 302 R, 323; 210/470, 473, 474, 475; 426/433
See application file for complete search history.

(56) References Cited

U.S. PATENT DOCUMENTS 5,393,548 A * 2/1995 Heiligman ..................... 426/433
5,718,163 A * 2/1998 Termini ........................... 99/286

(Continued)

FOREIGN PATENT DOCUMENTS

EP 1472156 B1 11/2004
JP 06-507375 8/1994

(Continued)

OTHER PUBLICATIONS

International Search Report for International Application No. PCT/EP2009/050739 mailed on Mar. 17, 2009.

(Continued)

*Primary Examiner* — Dana Ross
*Assistant Examiner* — Lindsey C Teaters
(74) *Attorney, Agent, or Firm* — K&L Gates LLP

(57) ABSTRACT

A device for preparing a nutritional composition by supplying water to ingredients provided to the device includes a pump connected to an integrated or external water supply, and a water discharge head designed for providing water to a cartridge containing ingredients for interaction between water and the ingredients in the cartridge. The pump and the water discharge head are in water communication via a water flowpath, and the pump can supply water under pressure through the water flowpath The device includes a rigid filter assembly having at least one antimicrobial filter membrane and filter enclosing member. The filter assembly and the filter enclosing member are complementary configured such that the filter assembly is insertable into the filter enclosing member across the water flowpath in a fluid tight manner before the water discharge head, and is removable from the filter enclosing member.

26 Claims, 8 Drawing Sheets

(56) References Cited

U.S. PATENT DOCUMENTS

| | | | |
|---|---|---|---|
| 6,517,880 B2 * | 2/2003 | Walters et al. | 426/433 |
| 2004/0118297 A1 | 6/2004 | Huda et al. | |
| 2005/0263452 A1 * | 12/2005 | Jacobson | 210/484 |
| 2006/0133848 A1 * | 6/2006 | Lewis et al. | 399/106 |
| 2007/0199888 A1 | 8/2007 | Japp et al. | |

FOREIGN PATENT DOCUMENTS

| | | |
|---|---|---|
| JP | 09-108113 | 4/1997 |
| JP | 10-033378 | 2/1998 |
| JP | 2006-209447 | 8/2006 |
| WO | WO0150875 | 7/2001 |
| WO | WO0151166 | 7/2001 |
| WO | WO2006077259 | 7/2006 |
| WO | WO2007131559 | 11/2007 |
| WO | WO2008012314 | 1/2008 |

OTHER PUBLICATIONS

Written Opinion for International Application No. PCT/EP2009/050739 mailed on Mar. 17, 2009.

* cited by examiner

EXCHANGEABLE FILTER FOR BEVERAGE PRODUCTION DEVICE AND BEVERAGE PRODUCTION DEVICE COMPRISING SUCH FILTER

BACKGROUND OF THE INVENTION

The present invention relates to a filter for a device for providing a ready-to-drink nutritional composition such as an infant formula. More particularly, the present invention relates to an exchangeable filter card which is removably insertable into a device in order to improve the hygiene level and ease the maintenance of the device.

Infant formulas have been developed as a substitute for human breast milk in order to provide required nutrients to infants. In general the infant formulas are either based on cow or soy milk and may be provided in different forms such as powder or concentrated liquid form.

Each of the different forms in which infant formulas may be provided has their own advantages. For instance, although the infant formula provided in a powder form has a relative high nutritional quality, the preparation thereof may be regarded as inconvenient and time consuming, since water which has been boiled in advanced and allowed to cool has to be poured into a sterilised drinking vessel containing the powder in order to prepare a liquid infant formula. The same inconvenient preparation process exists for infant formulas in concentrated liquid form.

If prepared and consumed in this manner, powdered infant formulas provide a safe and nutritionally good substitute for mother's milk. However, primarily due to the inconvenient preparation, many parents or caregivers do not prepare the formulas properly and hence expose the infant to risks of infection or other risks. For instance, if water is not properly sterilized prior to use or if the final preparation is prepared too long in advance, there can be a risk of transmitting pathogens to the infant. Usually, water sources in developed countries are safe but this may not be the case everywhere.

In further development, infant formulas in ready-to-feed single serve portions have been introduced which overcome the inconvenience of the preparation of the infant formula. However, these ready-to-feed products are more costly than infant formulas stored in bulk and they often suffer the disadvantage that once the portion is opened, it has to be consumed immediately to avoid the risk of contamination with bacteria. Moreover, even the single serve portion infant formulas are reconstituted with water. Hence, there is a risk that the water may not necessarily be properly sanitized and that the single serve baby bottles are prepared in advance in bulk and stored.

The immune defences of infants and young children are generally not fully developed and, as a result, these populations are particularly vulnerable to both bacterial and viral infections. For example, they may be prone to infections in circumstances where the immune system of a healthy adult would resist infection or they may suffer more serious consequences as a result of infection than would a healthy adult. Similar difficulties may arise in populations where the immune system is compromised such as the elderly. The consequence of this is that devices that prepare nutritional compositions which are perfectly safe for healthy adults may not be able to produce products which meet the increased safety standards required for products to be consumed by subjects having immature or compromised immune systems.

Therefore, a method or an apparatus is sought-after which enables a provision of nutritional composition for instance an infant formula in a convenient and safe manner.

WO2006/077259 discloses a method for preparing a single serving of a nutritional composition comprising introducing liquid such as water into a cartridge containing a unit dose of the composition in concentrated form. Thereby, the water is treated prior to the introduction into the cartridge in order to remove pathogens from the water. This treatment may be for instance a pre-heating, a filtering or an irradiation of the water with ultra-violet light.

A device which teaches the principle of treating water by means of a filter used for the preparation of nutritional compositions in a dispenser from cartridges is disclosed in co-pending European patent application No. 06117801.8 filed 25 Jul. 2006 entitled "Dispenser for preparing a nutritional composition". Accordingly, a convenient solution for treating the water can be provided in order to ensure that the water is free of pathogens. However, the filter in the disclosed device is incorporated in the water discharge means.

In order to ensure a high standard of safety with regard to the removal of any pathogens which may be contained in a liquid used for the preparation of a nutritional composition, the provided filter of such a device may have to be changed repeatedly. Therefore, an improved filter system is sought-after which enables exchangeability and/or maintenance of the filter to provide the necessary level of hygiene and food safety.

US20070199888 relates to a water filter for a coffee machine that has tabs to be attached to the brew basket of a machine. However, this water filter is simply slidably engaged below a brewing basket which receives water at atmospheric pressure. The filter is said to have a thickness of several millimeters. However, this filter is not intended to remove pathogens to treat water.

WO01/50875A1 relates to a drip coffee brewer comprising a liquid reservoir connected to a heater and a liquid outlet positioned above a supporting device holding a filter assembly. The filter assembly is designed to remove pathogens. The filter is configured with a reservoir to be able to receive dripping water which accumulates against the filter. Such system is so designed to slowly filter water at atmospheric pressure by a principle of percolation. Furthermore, the filter assembly requires a complex filtering structure including an adsorbent supporting web substrate having a surface fused to a mixture of adsorbent particles and binder particles.

The present invention seeks to address the above described problems. The invention also aims at other objects and particularly the solution of other problems as will appear in the rest of the present description.

In particular, the invention aims at providing a solution for supplying water, free of undesired micro-organisms in a device for preparing a nutritional composition, at a certain pressure (above atmospheric) and flow rate for an effective interaction with the ingredients.

OBJECT AND SUMMARY OF THE INVENTION

In a first aspect, the present invention proposes a device for preparing a nutritional composition by supplying water to ingredients provided to the device,
  said device comprising a device for putting the fluid under pressure, e.g. a pump, being connected to an integrated or external water supply,
  a water discharge head for providing water to a cartridge containing ingredients for interaction between water and the ingredients in the cartridge, wherein the pump and the water discharge head are in water communication via a water flowpath, whereby the pump can supply water at pressure above atmospheric through the water flowpath, a rigid filter assembly comprising at least one antimicrobial filter membrane and filter enclosing means, wherein the filter assembly and the filter enclosing means are complementary configured such that the filter assembly is insertable into the filter enclosing means across the water flowpath in a fluid tight manner before the water discharge head, and is removable from the filter enclosing means.

With a device according to the present invention, it is possible to enable an interaction between water supplied in the device, more particularly by the pump connected to the water supply, and ingredients contained in the cartridge. Thereby, water is preferably provided to the water discharge head by a water supply disposed upstream, e.g., at an upper side, of a cartridge receiving chamber. Note that the term "water supply" encompasses also any water supply line of the device which is connectable to an outside tap water or reserve of water foreign to the device itself.

The water in the disclosed invention is inserted in the cartridge through a needle with a preferred flow rate of between 100 to 500 ml/min, e.g., approximately 400 ml/min. This creates a jet with sufficient energy to dissolve the ingredients within the cartridge. The filter membrane of the antimicrobial filter may be chosen dependent on the pressure drop across the membrane within the water flowpath. The lower the pressure drop across the filter, the higher the energy of the jet and therefore the dissolution of the ingredients within the cartridge.

An outlet is preferably disposed downstream, e.g., at a lower side of the water discharge head. Thus, after the interaction between the water and ingredients in the cartridge, the output of the nutritional composition to be prepared takes place downstream, e.g., at the lower side of the water discharge head thence, enabling a flow of the nutritional liquid composition into a receptacle such as a cup or a vessel which may be placed beneath the cartridge.

In another preferred embodiment, it may as well be possible to place the filter means downstream of the water discharge head. Hence, the filter may be used for filtering the dissolved infant formula which results from introducing water into the cartridge. Accordingly, any pathogens in the infant formula can be removed. As the resulting liquid flow discharged by the cartridge is not subjected to high pressure, means for enabling a predefined flow rate through the filter may be provided. For example, the surface of the filter may be enlarged or pressure may be exerted on the resulting liquid flow from the cartridge by means of a dedicated pump or the like.

The rigid filter assembly provided to the water flowpath between the pump and the water discharge head is provided with at least one antimicrobial filter membrane acting as a physical barrier to control the permeability to micro-organisms, in particular, block the passage to bacteria or pathogens potentially present in the supplied water. Hence, a safe preparation of the nutritional composition can be assured.

In a preferred embodiment, a cartridge containing ingredients for the preparation of a nutritional composition may be provided. The cartridge is received in a cartridge receiving chamber of the device. Said cartridge is preferably a single-use cartridge which contains a dose of nutritional composition to be hydrated (e.g. diluted, dispersed and/or infused with water). Thus, water provided to the cartridge can be used to reconstitute the nutritional composition. The cartridge preferably comprises a water injection face and a delivery face.

In possible modes of "direct-flow" gastight cartridges, preferably, as described in European patent EP1472156B1, or also eventually in other modes such as in international patent application WO2007131559, a pressure is typically built up within the cartridge during water injection, which causes a lower face (or septum) of the cartridge to open thence, enabling the output of the liquid to be prepared. Since the output of the beverage to be prepared takes place at the lower face of the cartridge with no contact with opening means of the device, the flow of the liquid can be directly poured into the receptacle, e.g. a baby bottle, without contaminating the surfaces of the device. This results in a very hygienic preparation and delivery of the nutritional preparation.

After the injection of water into the cartridge, the pouring from the cartridge may be delayed in order to provide sufficient time for interaction of the water and the ingredients, e.g., to obtain complete dissolution of the ingredient in water. For the pouring of the beverage to be prepared from the cartridge, opening means such as reliefs which may be arranged against a delivery tearable foil in order to tear the membrane in a controlled manner. These opening means interact with the foil in response to the pressure rise within the cartridge when injecting water. The nutritional composition to be prepared can then flow directly from a dedicated outlet of the cartridge into the receptacle without contacting the device.

EP1472156B1 discloses various suitable cartridge configurations that may be used in the device of the present invention.

Thereby, the use of a new single-use cartridge for the preparation of a nutritional serving coupled with the specific "direct flow" features of the cartridge, i.e., including an inside pressure-responsive opening technology within the cartridge and draining the liquid directly from the cartridge into a receiving vessel such as an infant's bottle both greatly facilitates the preparation of the nutritional product and make it significantly safer with substantially reduced or even eliminated risk of contamination.

This is particularly advantageous if the apparatus is to be used in a hospital nursery where infant formulas must be prepared not only for healthy infants but also for infants suffering from specific diseases, deficiencies or severe allergies, for example allergies to cows' milk.

Moreover, the device may be provided with means to regulate the amount and/or temperature of water to be dispensed into the cartridge so that it stops the flow of water when a pre-selected or automatically controlled quantity has been dispensed. Water regulation means may comprise a water pump, and a control unit of the device comprising programs, a cartridge recognition system between the cartridge and device, e.g., barcodes on the cartridges and the like, for properly controlling the physical conditions of water delivered in respect to the type of cartridge.

The device may further be provided with purging means to empty the cartridge from residual liquid, for example, by flushing the liquid in the cartridge with a gas. Purge means also reduce the risk of contamination by a back-flow of the nutritional composition into the device. A suitable gas is compressed air at a pressure of between 200 mbar and 2 bar, for example 300 mbar which can be pressurized by an air compressor in the device.

Since the filter assembly is designed to be inserted to or removed from the device, a used filter assembly can be exchanged by a new filter according to user's instructions or in response, for example, to an alerting signal, such as a led flashing on the device or an indication on an LCD screen. These indications can be triggered when a specific number of servings have been provided or when a specific volume of water has been run through the filter assembly. The change signal may as well be triggered by a sensor measuring the flow rate through the filter or the pressure above and/or below the filter. Alternatively, the filter assembly can be recycled, for example, by carrying out a proper thermal processing of the filter assembly out of the dispenser, e.g., sterilization, according to user's instructions. Thus, the filter means can be removed effortlessly after a certain pre-defined time for exchange or recycling in order to ensure proper water filtering conditions in the device ensuring a safe water supply to the device. However, the filter may as well be sterilized within the machine by a provided steam generator.

Preferably, the filter assembly connected to the device comprise a frame for housing at least one antimicrobial filter membrane. Thereby, the antimicrobial filter membrane means a filter that is designed to filter pathogens or undesired micro-organisms such as bacteria, virus, yeast and/or mold or other microparticles, from the water to be filtered. The antimicrobial filter membrane may have a nominal pore size of 0.45 microns or less. A particularly preferred nominal pore size is between 0.01 and 0.45 microns. For filtering bacteria, the nominal pore size can be of between 0.1 to 0.3 microns, most preferably of about 0.2 microns. For filtering virus, the pore size can be reduced as low as 0.05 microns or even lower. A more porous membrane could be selected if a higher flow rate is required when the removable of pathogens is less critical.

For the use with the present device, a polymer membrane such as e.g. a superposed hydrophilic PES (polyethersulphone) membrane produced by Pall Corporation Switzerland or any other thin filter membrane e.g. made from a polymer having comparable specifications can be used (e.g. Millipore membranes). Antimicrobial filter membranes made from plastic materials are preferred. Preferably the thickness is less than 2 µm, more preferred less than 1 µm. Preferably the filter assembly comprises one or more of these thin membranes. Preferably the anti-microbial effect is achieved by filtration and not e.g. by adsorption produced e.g. by activated carbon. This has the effect that the filter can be more easily regenerated (in comparison to activated carbon).

By use of such a filter, the risk of contamination of the nutritional composition to be prepared can be significantly minimized.

The thin antimicrobial filter membrane(s) being physically sensitive and not easy to manipulate, the filter assembly preferably comprises water permeable backing means positioned, preferably adjacent, to support the antimicrobial filter membrane(s). Such backing means may for example be least one perforated wall which is abutting the filter membrane and extends across the direction of the flow path at the downstream side of the filter assembly, in order to support at least partially the surface of the filter membrane. Thus, breaking and/or deflection of the filter assembly when water is passed through it can effectively be prevented. Most preferably, a second perforated wall is placed adjacent the membrane and extends across the direction of the flowpath to further support the membrane at the upstream side of the filter assembly. The perforated walls may be formed of several ridges or a grid for example.

Moreover, in case the filter is blocked, the differential pressure across the filter membrane can go from about 0.1 bar up to 10 bars. In such a case, the backing means can provide a protection for the filter membrane in order to prevent rupture of the membrane. The backing means also provide a protection for the membrane when it is manipulated and inserted in the device.

In order to ensure fluid tightness between the filter assembly and the water path of the device, sealing means are provided at the interface of the filter assembly and device. Preferably, the sealing means are located around the filtering section of the filter assembly and/or the outlet and inlet of the channels. The sealing means may be part of the water communication channels of the dispensing device and/or part of the filter assembly. A possible material for the seal is Santopren or Thermolast K. Preferably, a lip-seal is provided which enables a water-tight assembly of the filter and the device at high pressures.

The device further comprises a steam generator connected to the fluid communication path in order to sanitize the filter assembly and the other surfaces of contact with water such as the tubing, the water discharge head and the cartridge receiving chamber of the device. The filter is therefore manufactured and assembled in such a manner to resist steaming, up to, for example, 120° C. Therefore, according material is selected, e.g. PP for the rigid frame of the filter assembly and Santopren for the seal.

The filter assembly for the device can be preferably inserted to or removed from an aperture disposed in an easy accessible position. The aperture is preferably disposed on one face of the device, e.g., the top face of the device. Thus, the exchangeability of the filter assembly is significantly enhanced since any user may carry out an exchange of the filter assembly.

Multiple use of the same filter membrane should be prevented as the filter does not have the same properties after being used during a long time. Therefore, an element may be mounted on the filter assembly and/or on the device to prevent multiple use of the same filter membrane. Each filter membrane may for instance be individually marked with a barcode and remembered by the device. Another possible solution is to have an element on the filter assembly that breaks when the filter is removed and prevents a new insertion mechanically or by a sensor in the device.

When the filter assembly is fully inserted to a corresponding aperture of the device, the filter assembly may be locked by locking means provided at the filter assembly and/or the device. For example, a snap fit may be provided at the filter assembly which may interact with a protruding or recessed element provided in vicinity of the aperture of the device when the filter assembly is fully inserted into the aperture. When a user intends to remove the filter assembly from the device, the snap fit can be released by the user and hence, the filter assembly can be removed from the aperture of the device. The filter assembly may as well be locked within the aperture by means of friction which is exerted onto the filter assembly by the adjacent faces at the inside of the aperture when the filter assembly is connected to the device. Frictional forces may as well be exerted by the sealing means of the filter assembly and the corresponding faces within the aperture being adjacent to the sealing means when the filter is inserted into the aperture. When inserting the filter assembly into the aperture, the user has to apply a certain force in order to overcome the frictional forces and hence fully insert the filter assembly into the aperture. The same applies to the removal of the filter assembly from the aperture. Accordingly, locking of the filter card within the device is achieved and the filter assembly can be connected to the device in a stable and safe manner.

In another preferred embodiment, the closing mechanism comprises at least two enclosing members to enclose the filter assembly which are relatively moveable to each other. Accordingly, when the filter is provided to the corresponding aperture at the device, the closing mechanism is to be operated by a user in order to enable a relative motion of the enclosing members and hence enclose the filter assembly situated within the aperture. Thus, as the enclosing members are approached, a filter assembly situated between the enclosing members can be effectively enclosed. Accordingly, the filter assembly can be hold at a fixed and stable position during operation of the device. For this purpose, a lever may be provided at the housing of the device which is connected to at least one of the enclosing members. Thus, by operation of the lever, a user may enclose and/or release the filter assembly between the enclosing members. Of course, the enclosing of the filter assembly may be operated automatically. Therefore, a button may be provided at the housing of the device which enables an operation of a dedicated motor which permits a relative motion of at least one enclosing member to enclose and/or release the filter assembly within the aperture.

In addition, a proximity sensor may be provided at the bottom of the aperture in order to detect a presence of the filter assembly. Thereby, the proximity sensor is connected to the pump of the device. Thus, the operation of the pump is preferably only possible when the proximity sensor detects a presence of the filter assembly. Accordingly, a safe operation of the system is enabled as the device can only be operated when the filter assembly is fully inserted into the aperture of the device.

The nutritional composition to be prepared by the device according to the present invention may be any composition which by nature is very sensitive to contamination by pathogens. Examples of preferred nutritional compositions for use in the method of the present invention are infant formulas, growing up milks and liquid infant cereals. The ingredients of the composition are not critical to the method of the present invention and other food powder or liquid concentrate may be used. Examples of different types of infant formula that may be used in the method of the present invention include whey protein dominant formulas, formulas containing a mixture of whey and casein, formulas based on other proteins such as soy, formulas in which the protein component is partially or extensively hydrolyzed etc. The nutritional composition is preferably stored in a gastight single-use cartridge provided to the chamber, in powder form or concentrated liquid form.

A ready-to-drink nutritional composition may also be prepared according to the method of the present invention using more than one cartridge to prepare a single serving. This permits a degree of flexibility in the compositions that is prepared. For example, a range of cartridges containing different supplements may be manufactured and consumers may be provided with instructions as to how to combine these to prepare a personalized composition suited to the particular needs of the recipient.

In a second aspect, the invention proposes a filter card for being connected to a device for preparing a nutritional composition, said filter card comprising a frame for holding in position at least one antimicrobial filter membrane and at least one rigid water permeable backing member for supporting the filter membrane. The backing member may be placed adjacent or close to the filter membrane. The backing member may be perforated with small holes but of a diameter sufficiently large to minimize the pressure drop at the member.

With a filter card according to the present invention, the required water filtering function for the device can be provided in a more convenient and safer way. In particular, the exchange of the filter means by a filter card can be operated by any user. Moreover, the rigidity of the frame of the card makes it easy to manipulate and to protect the fragile and not inherently form stable membrane(s), as well as to ensure the correct positioning of the card in the device.

Moreover, the perforated backing member(s) disposed adjacent to the antimicrobial filter membrane(s) supports the filter membrane to maintain its integrity under the pressure of water (e.g., avoid it to tear, collapse, deflect or crease).

Thereby, the perforations have preferably a wider diameter than the pores of the filter membrane (e.g. 0.6 mm). Hence, water passing through the filter card is not deflected by the backing members and the filter membrane can be subjected to a high liquid flow rate without the risk of deflection and/or breaking of the filter membrane.

Preferably, the frame of the filter card is made of rigid plastic and/or metal material.

The filter membrane is a preferably flat membrane which has a nominal pore size between 0.01 and 0.45 microns, most preferably between 0.1 and 0.3 microns, as already described. Hence, pathogens present in the water to be used for the preparation of the nutritional composition can effectively be blocked in the membrane. It can be noted that the membrane is asymmetrically designed in such a manner that it may comprise a varying pore section in the flow direction through the membrane thus determining an inlet filtering side and an outlet filtering side for the membrane. In particular, the pore widens from inlet side toward the outlet side.

In another preferred embodiment, at least one antimicrobial filter membrane is sandwiched between at least two perforated backing members. Thereby, the perforations of the backing members can be aligned such that water which is conducted through the perforations is not deflected. Moreover, the perforations have preferably a wider diameter than the pores of the filter membrane. Hence, water passing through the filter card is not deflected by the backing members. Thereby, the flow resistance generated by the perforations of the backing members can be regarded as lower than the flow resistance of the pores of the membrane(s).

However, it may as well be possible to provide an embodiment of the filter card, wherein two or more perforated backing members of aligned perforations are situated at each side of the filter membrane. The upstream backing member thereof which are disposed adjacent to a first filter membrane have preferably perforations of smaller diameter than a downstream backing members. Therefore, the outer backing members are designed such that no water is deflected when being passed through the filter card. The downstream backing member may support a second filter membrane. Accordingly, it is possible to provide a filter card which can sustain a high pressure drop across the filter card when being connected to a water flowpath. Preferably, the pressure drop within the water flowpath across the filter means is below 1 bar.

Furthermore, the filter card preferably comprises sealing means for ensuring water tightness of the filter when being connected to the device, in particular, for avoiding any water to by-pass the filter card. Hence, when water is passed through the filter card, the sealing means prevent a leakage of the water flowpaths into which the filter card is inserted.

Moreover, the perforated backing members of the filter card may be designed such that they can be supported by support members of the device to which the filter card is connected. For instance, support areas may be provided at the surface of the backing members. Thus, support members connected to the device may be designed to abut on said support areas in order to provide additional support for the filter card against deflection and/or breaking. Hence, a stable and fixed position of the filter card within the water flowpath can be assured.

Preferably, the filter card further comprises guiding means which are connected to the frame of the filter card. The guiding means can be asymmetrical such that the filter card is insertable in the device by only one predetermined side. The guiding means may be a protrusion or, alternatively a groove, at only one side of the frame which fits in a corresponding groove or, alternatively protrusion, in the aperture of the device into which the filter card may be inserted. This asymmetrical card configuration ensures that the user is effectively prevented from inserting the filter card in the wrong way. Since as described, the filter membrane(s) may be designed asymmetrically, it is important to respect a correct insertion side of the card.

Furthermore, the filter card may be equipped with locking means in order to ensure a safe and stable connection between the filter card and the device the filter card is connected to. For example, a snap fit may be provided at the filter card which may interact with a protruding or recessed element provided in vicinity of an aperture at the device when the filter card is fully inserted into the aperture. Thus, when a user intends to remove the filter card from the device, the snap fit can be released by the user and hence, the filter assembly can be removed from the aperture of the device.

Moreover, it is important to ensure that the water to be filtered is flowing through the filter membrane(s) and will not bypass it by its outer edge. Therefore, sealing means are provided between the backing means and the filter membrane. Such sealing means may comprise plastic sealing material which is provided to the outer edge of the filter membrane by an overmoulding process. Alternatively, an o-ring may be provided within the assembly to prevent the water from by-passing the filter membrane. In case an o-ring is used, the filter membrane should be mono-directional in order to prevent a radial water flow trough the membrane and bi-pass it by capillarity.

BRIEF DESCRIPTION OF THE DRAWINGS

Further features, advantages and objects of the present invention will become apparent for the skilled person when reading the following detailed description of embodiments of the present invention, when taking in conjunction with the figures of the enclosed drawings.

FIG. 5b shows a sectional drawing of a preferred embodiment of a backing member according to line A-A shown in FIG. 5a.

DETAILED DESCRIPTION OF EMBODIMENTS

Figure 1:
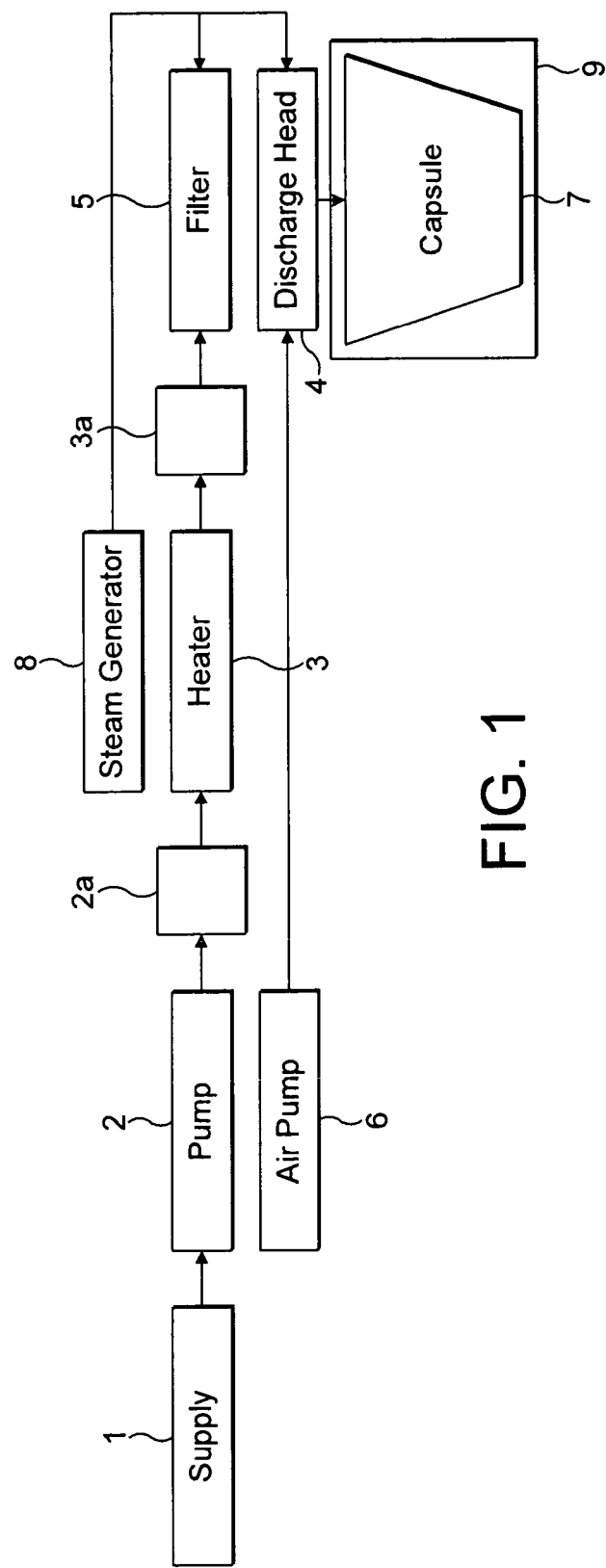
FIG. 1 shows a schematic drawing of a preferred embodiment of the device according to the present invention for preparing the nutritional composition.

FIG. 1 shows a schematic drawing of a preferred embodiment of a device according to the present invention. The device comprises a water supply 1 connected to a water pump 2. The output of the pump is connected to a heater 3 which preferably comprises a coiled stainless-steel pipe in a die cast aluminium thermoblock (not shown). Power is supplied to the thermoblock sufficient to heat the water to the desired temperature as it passes though the pipe. The output of the heater is connected to a filter 5 which is connected to the discharge or injection head 4 of the device. Said discharge head 4 comprises a chamber 9 for housing a cartridge 7. The term "cartridge" refers, in the general concept of the invention, to a single-use package such as pod, capsule or sachet of various packaging materials containing nutritional ingredients.

The term "pump" means any technical means that can transport a liquid at a sufficient positive pressure from the water supply to the injection head. This means can be a pressure pump such as a piston pump, a diaphragm pump, a peristaltic pump, a gear pump, a centrifugal pump, a progressive cavity pump, a hand pump and the like.

Furthermore, flow control means 2a are provided preferably between the pump 2 and the heater 3 of the device. Moreover, temperature control means 3a are provided preferably between the heater 3 and the discharge head 4. Hence, the temperature and the flow of a liquid within the device can be controlled and adjusted.

In addition, an air pump 6 is connected to discharge head 4 in order to enable the flushing of any residua within a cartridge 7 into a receptacle disposed beneath the cartridge 7.

The cartridge 7 which is shown only schematically contains approximately 10 ml of ingredients. The ingredients are preferably provided in a powdered or in a liquid concentrated form within the cartridge 7. The preparation of a 100-ml single serving of a nutritional beverage such as infant formula with the device according to the present invention will now be described.

The cartridge 7 is located in the cartridge receiving chamber 9 of the discharge head 4 such that an injection element (not shown) protruding into the chamber 9 punctures a membrane sealing the cartridge 7. Flow control means 2a and temperature control means 3a are set such that a desired quantity of water at the desired temperature is provided to the cartridge. Thereby, water is preferably pumped at a pressure of about 0.2 bar from a water tank 1 (or a water supply line from outside) to the heater 3 where it is heated to a preferred temperature between 25 and 40° C. The heated water is then passed through the filter 5 to the chamber 9 of the discharge head 4 at a preferred pressure between 2 and 7 bar and dispensed from there into a cartridge 7 which contains a unit dose of a nutritional composition such as an infant formula. When the pressure in cartridge 7 reaches a predetermined value which is preferably 2.5 bars, the cartridge opens and the reconstituted infant formula is dispensed directly from the cartridge into a suitable receptacle such as a baby bottle (not shown). The air pump 6 is then operated to flush any remaining liquid out of the cartridge and into the receptacle.

In addition, a steam generator 8 is connected to the discharge head 4 and to the filter 5. In operation, the chamber 9 of the discharge head 4 and the filter 5 may be sterilised as often as desired by passing steam from the steam generator through the discharge head 4 and the filter 5.

Figure 2:
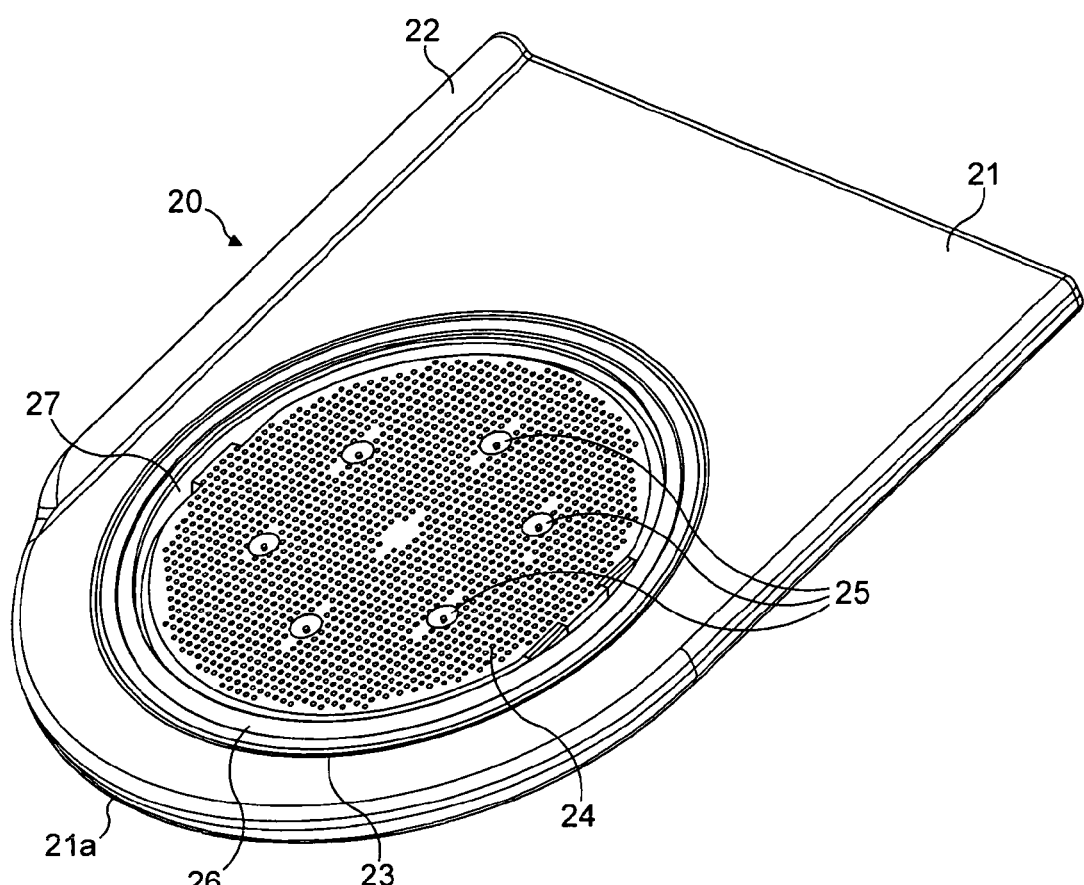
FIG. 2 shows a perspective view of a preferred embodiment of the filter card according to the present invention.

FIG. 2 shows a preferred embodiment of a filter card 20 according to the present invention. The filter card 20 comprises a frame 21 designed for housing a filter membrane (shown in FIG. 3) and at least one rigid perforated backing member 24. The frame 21 are preferably of rigid plastic or metal material equipped with a semicircular ending 21a which is the ending to be first introduced into an aperture such as a slot provided at a device and designed to receive the filter card 20. Due to the semicircular ending 21a, the filter card 20 can easily be inserted into a provided slot of the device, even if a user inserts the filter card 20 in a slanted way or offset the central axis of the aperture.

Furthermore, the filter card 20 comprises guiding means 22 in order to prevent a user from inserting the filter card 20 into a provided slot in an incorrect side. Preferably, the guiding means 22 is at least one protruding ridge provided at one of the edges of the filter card 20 and designed to be received by a corresponding groove 22a (shown in FIG. 3) provided at the aperture of the device, the filter card 20 is designed to be inserted to. Preferably, the guiding means 22 are an integral part of the frame 21.

Figure 3:
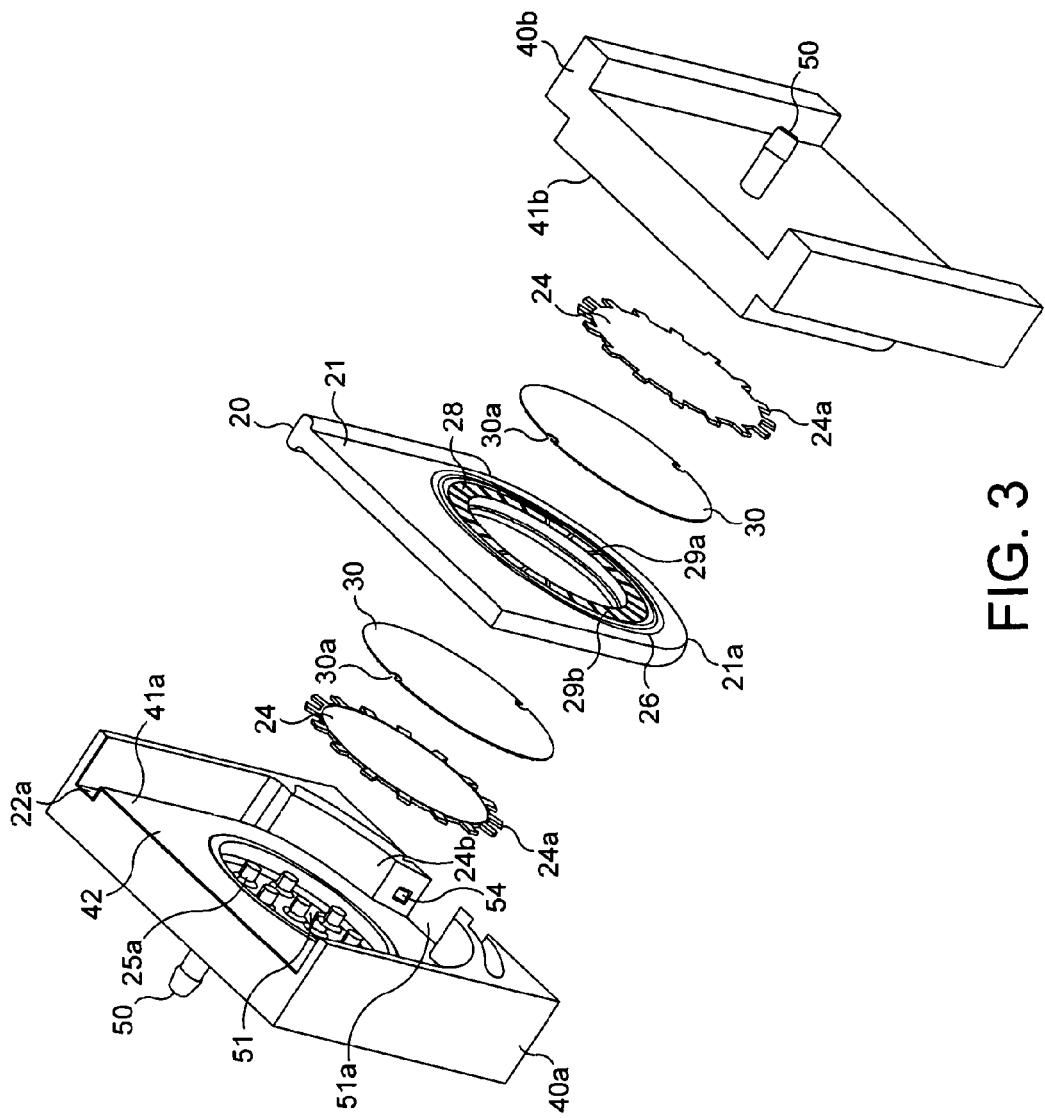
FIG. 3 shows an exploded assembly drawing of a preferred embodiment of the filter card being connected to the water flowpath.

As shown in FIG. 3, the frame 21 comprises a preferably circular aperture 23 for housing the filter membrane 30 and at least one perforated backing member 24. More preferably, at least one filter membrane 30 is placed or sandwiched between at least two backing members 24 which are situated in parallel and in close contact to the filter membrane 30. Furthermore, the backing members 24 are perforated in order to enable a flow of fluid through the filter membrane 30 and thus through the filter card 20. The diameter of the perforations of the backing members 24 is preferably wider than the nominal pore size of the provided filter membrane 30. Thus, the flow resistance of the backing members 24 does not influence the overall flow resistance of the filter card 20 in a negative way. Moreover, in the case when two or more perforated backing members 24 are provided to the filter card 20, the arrangement of the backing members 24 is adjusted such that the perforations of the backing members are aligned. Hence, water which is passed through the filter card 20 is not deflected.

The backing members 24 are preferably designed to be supported by support members 25a (shown in FIG. 3) of the device to which the filter card 20 is intended to be connected. Said support members 25a may for instance be ridges or the like designed to abut on the backing members when the filter card 20 is connected to the device. Therefore, the surface of the backing members 24 comprises support areas 25 onto which the support members 25a may abut. The support areas 25 are preferably uniformly distributed over the surface of the backing member 24. The support areas 25 do not comprise any perforations such that the support members 25a abutting on the support areas 25 do not deflect any water passed through the perforations of the backing members 24. Accordingly, the support areas 25 of the backing members 24 abutting on given support members 25a enable a stable position of the filter card 20 when being connected to a device for preparing a nutritional composition. The risk of deflection or breaking of the filter card 20 or particularly of the filter membrane 30 when water at high pressure is passed through the perforations of the backing members 24 can thus effectively be minimized.

Furthermore, the protection of the filter membrane 30 against deflection or breaking when water is passed through the filter card 20 may be enhanced by providing one perforated backing member 24 of sufficient rigidity to each side of the filter membrane 30. Thereby, the outer ones of said backing members 24 on each side of the filter membrane 30 have a wider diameter than the inner ones of the backing members 24 which are disposed in close contact to the filter membrane 30. Hence, liquid which is passed through the backing members 24 and through the filter membrane 30 is not deflected by the outer ones of the backing members 24. Furthermore, to enable a flow of water through the filter membrane 30 and the backing members 24, the perforations of all backing members 24 disposed on either side of the filter membrane 30 are arranged such that they are aligned.

Moreover, the filter card 20 comprises sealing means 26 for sealing the filter card 20 when being connected to a water flowpath 50 (shown in FIG. 3). The sealing means 26 are disposed at the aperture 23 of the frame 21. Preferably, the sealing means 26 is an O-ring or the like suitable for sealing the aperture 23 and thus the filter card 20 when water is passed through it. The sealing means 26 are preferably provided at either side of the filter card 20. The sealing means 26 may as well be provided at the water flowpath 50 which the filter card 20 is designed to be connected to. As shown in the drawing, the sealing means is preferably a lip-seal. The lip-seal is especially advantageous since pressure exerted onto the lip-seal enhances the sealing effect by pressing the lip against the counter part. Thus, the higher the pressure in the filter chamber, the higher the pressure which presses the lip against the counterpart. Hence, the preferred embodiment according to the figure is able to withstand pressure as high as 16 bars, for instance, without leaking.

Moreover, the sealing means 26, the backing members 24 and the filter membrane 30 are designed to be easily removed from the aperture 23 of the filter card 20. Therefore, fastening means 27 (see FIG. 2) are provided which can be connected to the aperture 23 of the filter card 20. Thereby, said fastening means 27 preferably enclose the filter membrane 30, the backing members 24 and the sealing means 26. The fastening means 27 is preferably a clamping piece or the like, designed to be connected to the aperture 23. Of course, the fastening means may as well be provided as an integral part of the aperture 23. Hence, when the filter card 20 is not connected to the designated water flowpath 50, a user may easily change the filter membrane 30, the backing members 24 or the sealing means 26. Accordingly, a repeatedly exchange of the filter membrane 30 may be performed in a convenient way in order to enhance the protection provided by the filter card 20 against pathogens.

FIG. 3 shows an exploded assembly drawing of a preferred embodiment of the filter card 20 being connected to the water flowpath 50. Thereby, the two enclosing members 40a, 40b are connected between the water flowpath 50 in order to enable a connection between the water flowpath 50 and the filter card 20. The two enclosing members 40a,40b enclose an aperture 42 formed by their surfaces 41a,41b into which the filter card 20 can be inserted. Thereby, the semicircular ending 21a of the filter card 20 abuts on a semicircular recess 21b at the bottom of the aperture 42 enclosed by the two enclosing members 40a,40b.

Furthermore, a linear groove 22a is preferably provided at one side of the aperture 42 and, preferably, one of the two enclosing members 40a,40b. The linear groove 22a is designed to receive the ridge 22 formed at one side of the filter card 20. Thus, the filter card 20 can only be inserted into the aperture formed by the two enclosing members 40a,40b in the correct side.

Each of the two enclosing members 40a,40b comprises a circular recess 51 at its inside which is concentrically arranged and which is connected to the water flowpath 50. Hence, the diameter of the water flowpath 50 can be adapted to the diameter of the filter membrane 30 provided at the aperture 23 of the filter card 20. Accordingly, the whole surface of the filter membrane 30 provided at the filter card 20 can be used for filtering water. When water is passed through the water flowpath 50 and thus trough the recesses 51, the recesses 51 are sealed by the sealing means provided at the frame 21 of the filter card 20. Of course, the sealing means 26 may as well be provided on the enclosing member around the recesses 51.

As can be seen from FIG. 3, support members 25a are provided within the recesses 51 of the enclosing members 40a, 40b. These support members 25a are preferably cylindrical protruding ridges which are abutting on the support areas 25 provided at the perforated backing members 24, when the filter card 20 is inserted into the aperture 42 enclosed by the two enclosing members 40a,40b. Thus, deflection and/or breaking of the perforated backing members 24 and thus of the filter membrane 30 can effectively be prevented.

In order to fully enclose the filter card 20 and fix its position within the aperture 42, the enclosing members 40a, 40b can be moved relatively to each other. Hence, after the filter card 20 is inserted into the aperture 42, the two enclosing members 40a, 40b can be approached and the position of the filter card 20 is fixed at a stable position and in a water-tight manner within the aperture 42. In the same manner, releasing the filter card 20 can be achieved by distancing the two enclosing members 40a, 40b from each other. In order to enable a relative movement of the enclosing members 40a, 40b, at least one of the enclosing members is connected to a closing mechanism (not shown) such as a lever or a motor which can be operated by a user.

In case the filter card 20 is disconnected from the device by distancing the enclosing members 40a, 40b from each other, the remaining water within the water path 50 and the circular recess 51 upstream of the filter is released in a controlled manner through an opening 51a provided at the bottom of the aperture 42. A collector below the opening 51a (not shown) is connected to a drip tray (not shown) so that the fluid can be discharged from the device.

Furthermore, the aperture 23 of the filter card 20 comprises a circular support 28 for mounting the filter membrane 30 and the perforated backing members 24 thereon. Thereby, the support 28 comprises locating means 29a,29b for determining the correct position of the filter membrane 30 and the backing members 24 when being mounted at the support 28 of the aperture 23. The locating means 29a provided at the support 28 interlock with locating means 30a provided at the filter membrane 30 and thus prevent relative rotation of the backing member and filter membrane and enable a user to correctly mount the filter membrane 30 at the support 28 of the filter card 20. Preferably, the locating means 29a is at least one protruding ridge which fits in at least one correct recess 30a provided at the circumference of the filter membrane 30. The backing members 24 are preferably provided with recesses 24a which are equally distributed over the circumference of the backing members 24. Hence, these recesses 24a interlock with corresponding protruding ridges 29b which are disposed at the circumference of the support 28 of the filter card 20. Thereby, the locating means 29b,24a for the backing members 24 are designed such that the perforations of the backing members 24 on either side of the filter membrane 30 are aligned. Accordingly, a user can effectively be guided to mount the filter membrane 30 and the perforated backing members 24 at the filter card 20 in a correct way.

In the shown embodiment, two filter membranes 30 are mounted at the support 28 of the filter card 20 which are sandwiched between two perforated holders 24. It may as well be possible to mount three or more filter membranes 30 to influence the filtration properties of the filter card 20.

A proximity sensor 54 may be provided at the bottom of the aperture 42 for inserting the filter card 20. The sensor enables to detect a presence of the filter card 20 within the aperture 42. The proximity sensor 54 is preferably connected to at least the pump 2 (see FIG. 1) of the device. Thereby, the sensor 54 preferably transmits a signal in response to the presence of the filter card 20 within the aperture 42. It can thus be ensured that the operation of the pump 2 is only possible when the filter card 20 is fully inserted into the aperture 42. Therefore, it can be prevented that a user unintendedly operates the device without having the filter card 20 fully inserted into the aperture 42.

Figure 4:
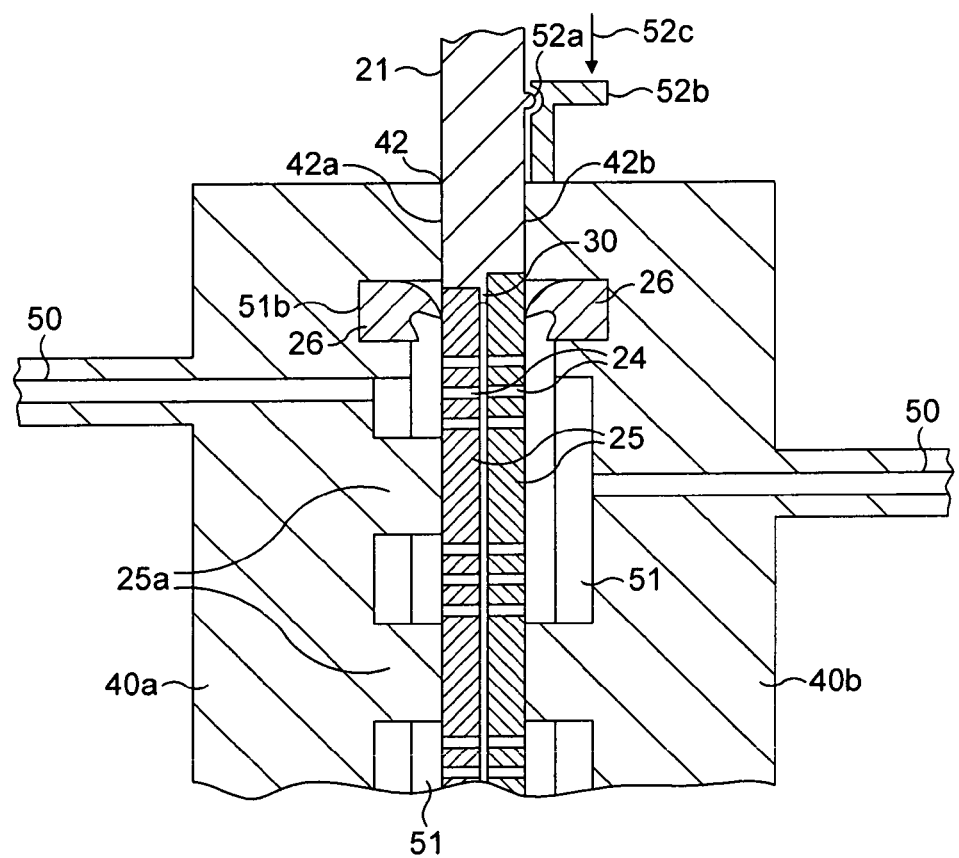
FIG. 4 shows a sectional drawing of a preferred embodiment of the filter card being connected to the water flowpath.

FIG. 4 shows a preferred embodiment of the enclosing members 40a, 40b enclosing a filter card 20 when being inserted into the aperture 42 and thus being connected to the water flowpath 50. As can be seen from the figure, the filter membrane 30 is sandwiched between two perforated backing members 24. The perforations thereof are aligned such that water passed through the filter card 20 is not deflected.

The water flowpath 50 is connected to a circular recess 51 formed in each of the enclosing members 40a,40b. Within the circular recess, protruding support members 25a are disposed, which are designed to abut on the support areas 25 of the perforated backing members 24 when the filter card 20 is inserted into the aperture 42. Thereby, the support areas 25 of the backing members 24 do not comprise any perforations.

As can be seen in FIG. 4, a circular recess 51b for housing sealing means is provided at both enclosing members 40a, 40b. The circular recess 51b is preferably concentric to the circular recess 51 housing the protruding support members 25a. The circular recess 51b for housing the sealing means 26 is disposed radially outside of the circular recess 51. Thus, the sealing means 26 housed by the circular recess 51b enable an efficient sealing of the aperture 42 when the filter card 20 is provided within the aperture 42 and when water is passed through the filter card 20. The sealing means 26 is preferably an o-ring or the like. Moreover, the sealing means 26 are preferably exchangeable. Hence, when the sealing means 26 are subjected to deterioration, a user may easily exchange the sealing means 26. As previously described, the sealing means 26 may as well be provided at the frame 21 of the filter card 20.

For ensuring a safe and stable defined position of the filter card 20 when the filter card 20 is fully inserted into the aperture 42, the two enclosing members 40a, 40b can be brought in tight contact to the filter card 20 by enable a relative movement of the two enclosing members, as already described. Alternatively, locking means 51a, 51b may be provided at the frame 21 of the filter card 20. As can be seen from FIG. 4, the locking means are e.g. a snap fit. Thereby, a protruding ridge 52a, preferably provided at the frame 21 of the filter card 20, interacts with at least one corresponding recess provided at the snap fit member 52b. By pressing the member 52b in direction of the shown arrow 53c, the user may loosen the connection between the filter card 20 and the snap fit member 52b and thus, the filter card 20 may be withdrawn from the aperture 42. The snap fit member 52b is preferably an integral part of one of the enclosing members 40a,40b.

In another preferred embodiment of the filter card 20, the defined safe and stable position of the filter card 20 within the aperture 42 is ensured by frictional forces (press fitting) between the frame 21 of the filter card 20 and the adjacent faces 42a, 42b. Hence, the fit of the frame 21 within the aperture 42 is chosen such that a user has to apply a certain force onto the filter card 20 in order to fully insert the filter card 20 into the aperture 42. The same applies for removing the filter card 20 from the aperture 42.

Figure 5A:
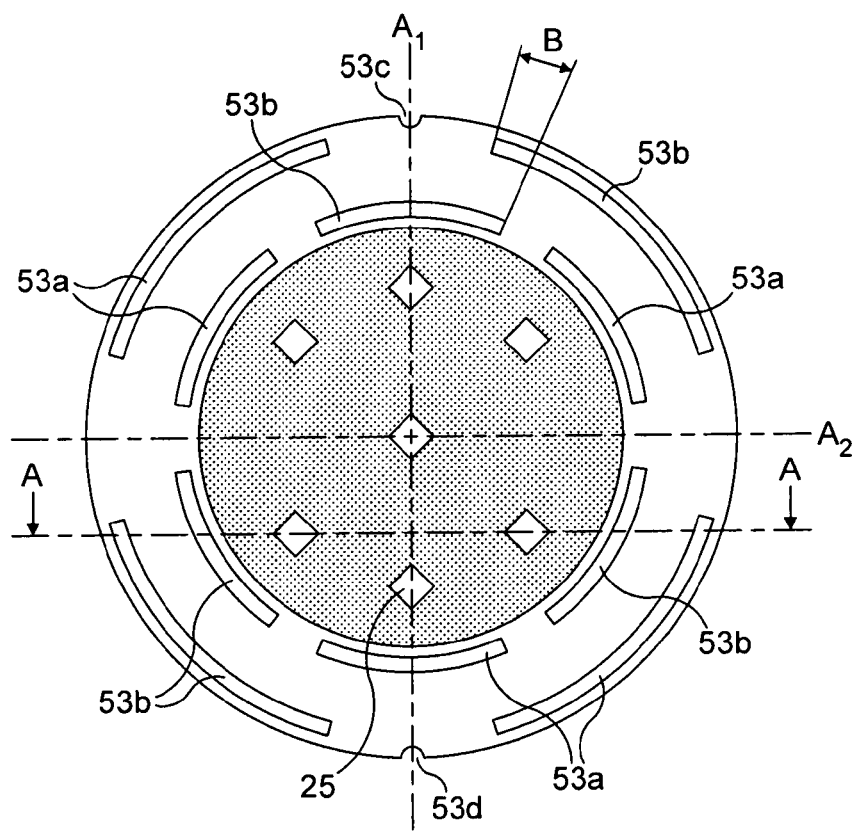
FIG. 5a shows a preferred embodiment of a backing member in top view.
Figure 5B:
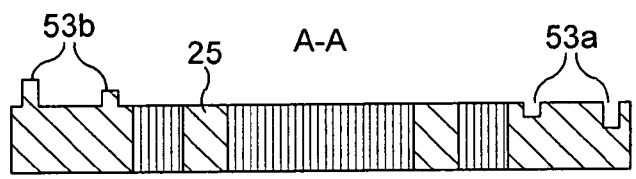

FIGS. 5a and 5b show a preferred embodiment of a backing member 24. Thereby, the backing member 24 has individual arcuated recesses 53a and ridges 53b which are formed to enable a perfect fit of two equal backing members 24 in a predefined angular position. Accordingly, the recesses 53a and ridges 53b of the first backing member 24 interlock with provided ridges 53b and recesses 53a of the second backing member 24. Hence, a relative rotation of the backing members 24 can be prevented. Moreover, as the relative angular position of the two backing members 24 is defined by the recesses 53a and ridges 53b, the perforation of the two backing members 24 can be effectively aligned. As shown in the figure, support areas 25 are provided at the backing member 24 in order to provide a surface onto which the support members 25a (see FIG. 3) of the device can abut.

As can be seen from FIG. 5a, the recesses and ridges are preferably arranged symmetrically about the perpendicular axes A1 and A2. Moreover, a semicircular recess 53c and a protruding semicircular part 53d are formed at opposing endings of the backing member 24. Hence, when two equal backing members 24 are connected to each other, the semicircular recess 53c and protrusion 53d of the two backing members 24 interlock with each other and the correct predefined assembly position of the two backing members 24 is obtained.

Between the two backing members 24, a filter membrane 30 (not shown) is placed which preferably has an outer diameter which is bigger than the diameter of the portion of the backing member 24 which is perforated.

As shown in FIG. 5b, the protruding recesses 53a and ridges 53b may vary in their dimensions. For example, the height of the recesses 53a and ridges 53b may be adjusted to enable a correct fitting of the two backing members 24 when assembled. Moreover, the recesses and ridges may overlap as indicated by reference B in FIG. 5a. Thus, a tight and correct fitting of the two backing members can be obtained.

In manufacturing process of the filter card 20, the filter membrane 30 is placed on one of the backing members 24. Then, the second backing member 24 is placed onto the first backing member 24, wherein their relative position to each other is defined by the arcuated recesses 53a and ridges 53b provided on their joint face. To secure the assembly, the frame 21 is injected. Thereby, injection ports are preferably provided at the backing members 24 in order to enable plastic material to pass through during the injection process and hence further secure the membrane between the backing members 24. Moreover, sealing means 26 which may be provided at outer surfaces of the backing members 24 can be placed in provided recesses at the backing members 24 before the injection process. Accordingly, the sealing means 26 can be secured to the backing members 24 by the injection process as well.

Figure 6:
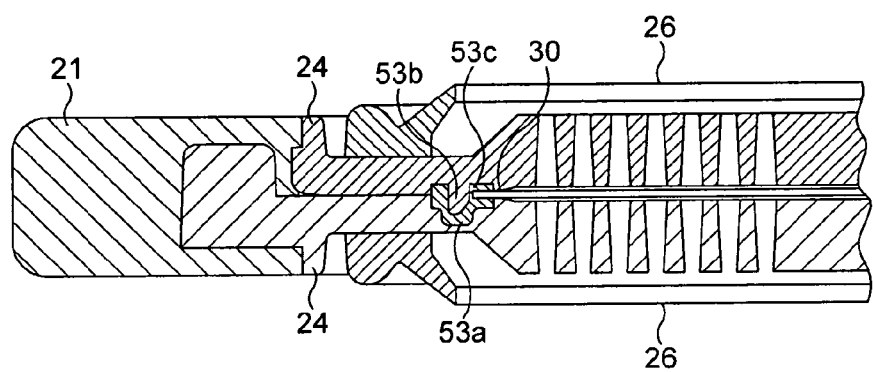
FIG. 6 shows a sectional drawing of a preferred embodiment of the filter card being equipped with a filter membrane sandwiched between two backing members.

FIG. 6 shows a sectional drawing of a preferred embodiment of a filter card 20. As can be seen from the figure, the filter membrane 30 is sandwiched between two perforated backing members 24. The perforation of the backing members 24 is designed such that the diameter of the perforations widens towards the filter membrane 30, i.e. the diameter of the perforations is bigger at the surface adjacent to the filter membrane 30 than at the outer surface of the backing member 24 being directed towards the water flowpath 50 (see FIG. 4).

As can be seen from FIG. 6, the two backing members 24 are interlocking due to provided circular recesses 53a and ridges 53b on the backing members 24. The position of the ridges 53b is chosen such that the filter membrane 30 is as close as possible to the protruding inner edge 53c of the protruding ridges 53b and/or recesses 53a. Hence, the filter membrane 30 can efficiently be held in place and a tight enclosing of the filter membrane is obtained.

Moreover, a lip-seal 26 is provided to the outer surfaces of the backing members 24 in order to seal the filter assembly when the filter card 20 is in connection with the water flowpath 50.

As already described, the sealing means 26 and the backing members 24 can be effectively connected to the frame 21 of the filter card 20 by means of the injection process during manufacturing of the frame 21.

Figure 7:
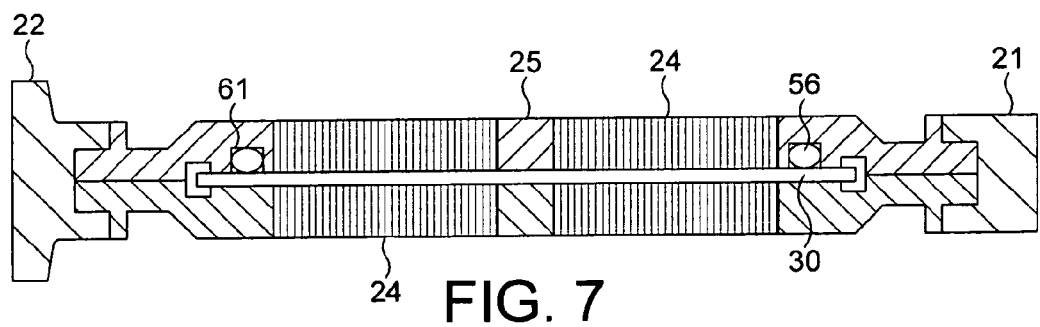
FIG. 7 shows a sectional drawing of another preferred embodiment of the filter card being equipped with an o-ring.

FIG. 7 is a sectional side view of another preferred embodiment of a filter card 20. In this embodiment, an o-ring 56 is placed in a provided circular recess 61 at one of the backing members 24. Accordingly, the outer joint face between the filter membrane 30 and the backing members 24 is sealed and water cannot by-pass the filter membrane 30. Preferably, the recess 61 and hence the o-ring 56 is provided at the backing member 24 which is situated on the upstream side of the filter card 20.

Instead of the shown o-ring 56, plastic material may be provided to the outer edge of the filter membrane 30 such that the plastic material is compressed by the backing members 24 when the filter card 20 is assembled. Such plastic material can e.g. be applied to the filter membrane(s) by means of rubber overmoulding. Accordingly, effective sealing of the filter membrane 30 can be provided such that water passed through the filter card 20 is prevented from by-passing the filter membrane 30 through the joint face of the two backing members 24.

Figure 8:
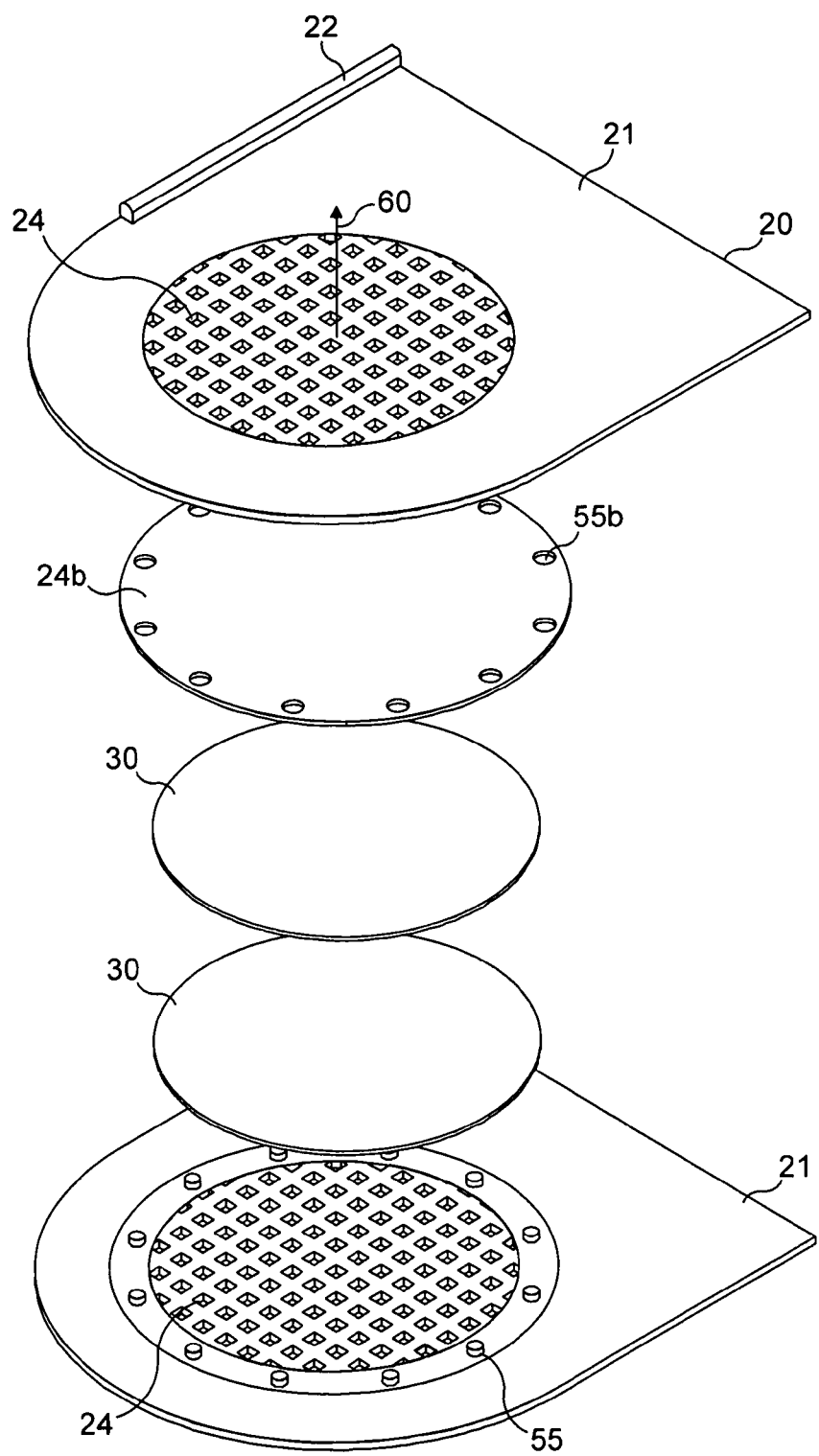
FIG. 8 shows an exploded assembly of another preferred embodiment of the filter card wherein the backing members are formed as an integral part of the filter card frame.

FIG. 8 shows an exploded assembly drawing of another preferred embodiment of the filter card. As shown in the figure, the backing means 24 are an integral part of the frame 21 of the filter card 20. The backing means 24 are relatively large compared to the other embodiments. The backing means 24 may be grids formed in the frame 21. Thus, dedicated support members 25a (see FIG. 4) provided at the device can abut on the grid 24 in order to support a stable position of the filter card 20 when it is inserted into the aperture 42 (see FIG. 4) of the device.

The frame 21 comprises two parts which can be assembled in order to enclose a filter membrane 30 there between. To enable a correct assembly of the frame 21, locating means 55a are provided. Preferably, the locating means 55a are protruding and/or recessed bolts arranged circularly around the grids 24. Thus, the two parts of the frame 21 can be effectively assembled and a relative motion of the frame parts 21 after the assembly is prevented.

As shown in FIG. 8, at least one filter membrane 30 is sandwiched between the grids 24 and thus can be effectively supported when water is passed trough the filter membrane 30. The direction of the preferred water flow through the assembly is indicated by arrow 60. Preferably, two or more filter membranes 30 are situated between the grids 24. Thereby, the filter membranes 30 are of different pore sizes. More preferably, the filter membrane situated relatively upstream has a wider pore size than the filter membrane(s) situated relatively downstream. For instance, the upstream filter membrane has a nominal pore size of 0.65 μm and the downstream filter membrane has a nominal pore size of 0.22 μm.

Furthermore, an additional membrane support 24b may be provided between the grids 24 in order to further support the filter membrane(s) 30. Preferably, the support member 24b is a circular aluminium grid wherein the openings of the grid have a smaller size than the backing members 24 of the frame 21. More preferably, the additional support 24b is positioned downstream of the filter membrane(s) 30. In addition, locating means 55b are preferably provided at the membrane support 24b which interact with the locating means 55a provided at the frame 21 in order to hold the support 24b at a fixed position relative to the frame 21. Preferably, the locating means are apertures formed close to the outer edge of the circular support member 24b.

In assembly process, the two frame parts 21 can be manufactured e.g. injected as separate pieces. After that, the additional backing member 24b may be fixed, e.g. glued, onto one of the backing members 24. Of course, two backing members 24b may be provided at each side of the filter membrane(s) 30.

Figure 9:
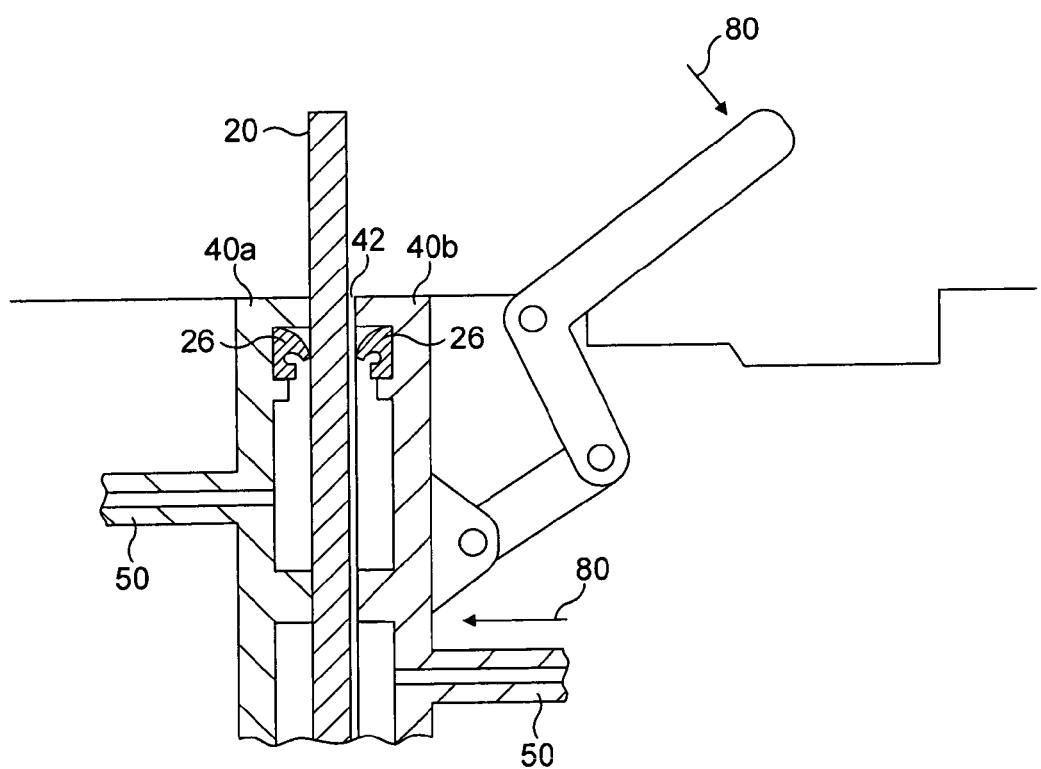
FIG. 9 shows a preferred embodiment of an enclosing mechanism designed to secure the position of the filter card within the dedicated aperture of the device.

FIG. 9 shows a preferred embodiment of the closing mechanism 70 of the device which is provided in order to enclose the filter card 20 between the two enclosing members 40a, 40b. The closing mechanism is preferably a lever connected to at least one of the enclosing members 40a, 40b which are moveable relative to each other. Alternatively, a dedicated motor which may be operated by a push button can be provided in order to enable a relative movement of the two enclosing members 40a, 40b.

As can be seen from the figure, the two enclosing members 40a, 40b are arranged such that a dedicated aperture 42 for inserting the filter card 20 is formed between them. When the filter card 20 is fully inserted by a user, as shown by the figure, the user may operate the closing mechanism 70 in order to enclose the filter card 20. Thereby, the closing mechanism 70 transmits mechanical forces in order to move the enclosing member 40b towards the other enclosing member 40a, as indicated by arrows 80. Hence, the two enclosing members 40a, 40b are approached and the filter card 20 situated between them is fixed in its position. Accordingly, the filter card 20 can be secured at a stable position in the aperture 42. Moreover, when the enclosing members 40a, 40b are approached, the sealing means 26 provided at the enclosing members 40a, 40b are pressed against the surface of the filter card 20, thereby enabling a water-tight sealing of the assembly.

When a user intends to remove the filter card 20, the closing mechanism is to be operated in advance in order to separate the two enclosing members 40a, 40b.

Although the present invention has been described with reference to preferred embodiments thereof, many modifications and alternations may be made by a person having ordinary skill in the art without departing from the scope of this invention which is defined by the appended claims. For example the filter membrane may be provided in another embodiment of a filter frame means such that the filter membrane can be exchanged relatively easy by any operator of the device. It may as well be possible to mount more than two filter membranes at the filter card in order to enhance the filtration properties of the filter card. Moreover, other filtration media could be incorporated by the removable filter card which enables a sufficient filtration of water. It may as well be possible to design a filter card having two or more apertures, each of them housing at least one filter membrane and at least one backing member, in order to filter water passed through two or more water flowpaths of a device to which the filter card is connected. Moreover, different embodiments of locating devices for the filter membrane and the backing members may be provided at the frame means of the filter card in order to enable the correct mounting of the filter membrane and the backing members.

The invention claimed is:

1. A device for preparing a nutritional composition by supplying water to ingredients provided to the device, the device comprising:
a pump connected to a water supply;
a water discharge head for providing water to a cartridge containing ingredients for interaction between the water and the ingredients in the cartridge, the pump and the water discharge head are in fluid communication via a water flowpath, the pump can supply water at pressure above atmospheric through the water flowpath;
a rigid filter assembly and a plurality of filter enclosing means;
the filter assembly comprises at least one antimicrobial filter membrane, the filter assembly complementary to the plurality of filter enclosing means such that the filter assembly is insertable into the plurality of filter enclosing means across the water flowpath in a fluid tight manner before the water discharge head, and is removable from the plurality of filter enclosing means; and
backing means for supporting the surface of the filter membrane, the backing means provided adjacent to the filter membrane and across the water path to control deflection and avoid breaking of the filter membrane when water is passed through the filter membrane, the plurality of filter enclosing means having protrusions that support the backing means, and the backing means comprise perforations and further comprise support areas that are aligned with the protrusions and do not have any perforations.

2. The device according to claim 1, wherein the filter assembly has a form of a substantially rigid card and the plurality of filter enclosing means forms a slot into which the card is insertable.

3. The device according to claim 1, wherein the filter assembly comprises a frame for housing a filter comprising the at least one antimicrobial filter membrane.

4. The device according to claim 1, wherein the pressure drop across the filter assembly is below 1 bar.

5. The device according to claim 1, wherein at least one of the filter assembly or the plurality of filter enclosing means comprises sealing means for providing a fluid tight seal of the filter assembly in the plurality of filter enclosing means when water is passed through the filter assembly.

6. The device according to claim 1, wherein sealing means are provided between the backing means and the at least one antimicrobial filter membrane of the filter assembly for sealing the outer joint faces of the backing means and the at least one antimicrobial filter membrane.

7. The device according to claim 6, wherein the sealing means is an O-ring placed between the upstream side of the at least one antimicrobial filter membrane and the backing means.

8. The device according to claim 1, wherein the device comprises a steam generator connected to the water flowpath for sanitizing the filter assembly connected to the water flowpath.

9. The device according to claim 1, wherein the filter assembly is insertable into or removable from an aperture located on a face of the device.

10. The device according to claim 9, wherein sensing means are provided within the aperture to detect the presence of the filter assembly when inserted into the device.

11. The device according to claim 10, wherein the sensing means is connected to control means for at least the pump of the device and wherein the pump is designed such that the operation of the pump is controlled by an output signal from the sensing means.

12. The device according to claim 1, wherein the filter assembly comprises locking means for interlocking with locking means located at the plurality of filter enclosing means of the device.

13. The device according to claim 1, wherein the nutritional composition is an infant formula to be prepared by a food composition provided to the device by means of a single-use cartridge insertable into the device.

14. A filter card designed for being inserted into a device for preparing a nutritional composition, the filter card comprising a frame for holding in position at least one antimicrobial filter membrane and at least two rigid water permeable perforated backing members for supporting the at least one antimicrobial filter membrane, the at least one antimicrobial filter membrane being sandwiched between the at least two rigid water permeable perforated backing members, the at least two rigid water permeable perforated backing members each having complementary recesses and ridges which interlock with each other in a predefined angular position, the at least two rigid water permeable perforated backing members comprise a first backing member comprising individual arcuate recesses that are distanced from each other along the circumference of the first backing member, and the at least two rigid water permeable perforated backing members comprise a second backing member comprising individual arcuate ridges that are complementary to the individual arcuate recesses of the first backing member.

15. The filter card according to claim 14, wherein the at least one antimicrobial filter membrane comprises a single antimicrobial filter membrane, and the first backing member and the second backing member are adjacent to the single antimicrobial filter membrane on opposite sides of the single antimicrobial filter membrane relative to each other.

16. The filter card according to claim 14, wherein the frame is made of a material selected from the group consisting of rigid plastic and metal for housing the at least one antimicrobial filter membrane.

17. The filter card according to claim 14, wherein the at least one antimicrobial filter membrane has a nominal pore size of between 0.01 and 0.45 microns.

18. The filter card according to claim 14, wherein the at least one antimicrobial filter membrane has a thickness of less than 0.5 mm.

19. The filter card according to claim 14, wherein each of the at least two rigid water permeable perforated backing members has perforations having a wider diameter than the pores of the at least one antimicrobial filter membrane.

20. The filter card according to claim 14, wherein:
the at least one antimicrobial filter membrane comprises a first filter membrane and a second filter membrane;
the first backing member is an upstream backing member located in close contact to the first filter membrane, and the second backing member is a downstream backing member located in close contact to the second filter membrane;
the perforations of the upstream backing member are aligned with the perforations of the downstream backing member; and
the perforations of the downstream backing member have a wider diameter than the perforations of the upstream backing member.

21. The filter card according to claim 14, wherein the filter card comprises water sealing means for sealing the filter card when connected to the device.

22. The filter card according to claim 14, wherein the first backing member of the filter card is arranged to be supported by support members of the device to which the filter card is connected.

23. The filter card according to claim 14, wherein the filter card comprises asymmetrical guiding means designed such that the filter card is insertable into the device at only one predetermined side.

24. The filter card according to claim 14, wherein the filter card comprises positioning means for securing the filter membrane and the perforated backing members according to a limited number of predetermined positions to the frame.

25. The filter card according to claim 14, wherein the filter card has a characteristic selected from the group consisting of: (i) the individual arcuate recesses arranged symmetrically on the first backing member, and the individual arcuate ridges arranged symmetrically on the second backing member, and (ii) the individual arcuate recesses comprise first arcuate recesses and second arcuate recesses, the first arcuate recesses concentric to and within the second arcuate recesses, the first individual arcuate recesses overlapping the second arcuate recesses in a radial direction.

26. A device for preparing a nutritional composition using water supplied to ingredients by the device, the device comprising:
a pump connected to a water supply;
a water discharge head for providing water to a cartridge containing the ingredients, the pump and the water discharge head are in fluid communication via a water flowpath, the pump can supply water at pressure above atmospheric through the water flowpath;
a rigid filter assembly and filter enclosing members, the filter assembly comprises at least one antimicrobial filter membrane, and the filter assembly and the filter enclosing members are configured such that the filter assembly is removably insertable into the filter enclosing members across the water flowpath in a fluid tight manner before the water discharge head; and
a backing member for supporting the surface of the filter membrane, the backing member provided adjacent to the filter membrane and across the water path to control deflection and avoid breaking of the filter membrane when water is passed through the at least one filter membrane, and the filter enclosing members having protrusions that support the backing member, and the backing member comprises perforations and further comprises support areas that are aligned with the protrusions and do not have any perforations.

* * * * *